United States Patent [19]

Wierzbicki et al.

[11] 4,034,606
[45] July 12, 1977

[54] GAS FLOW TRANSDUCER UTILIZING ROLLING PISTON

[75] Inventors: Charles E. Wierzbicki; William R. Leonards, both of Albuquerque, N. Mex.

[73] Assignee: Sparton Corporation, Jackson, Mich.

[21] Appl. No.: 640,484

[22] Filed: Dec. 15, 1975

[51] Int. Cl.² .................. G01F 3/08; G01F 1/24
[52] U.S. Cl. ............................................. 73/208
[58] Field of Search .............. 73/253, 261, 194 R, 73/207, 208, 209, 210

[56] References Cited

U.S. PATENT DOCUMENTS

| | | | |
|---|---|---|---|
| 1,454,301 | 5/1923 | Van Hise | 73/209 |
| 1,580,679 | 4/1926 | Roucka | 73/207 |
| 1,641,744 | 9/1927 | Decker | 73/208 |
| 2,070,374 | 2/1937 | Sherwood | 73/209 |
| 2,070,375 | 2/1937 | Sherwood | 73/209 |
| 2,674,880 | 4/1954 | Broderson | 73/207 |
| 3,452,175 | 6/1969 | Wilkes | 73/514 |
| 3,471,668 | 10/1969 | Wilkes | 73/514 |

*Primary Examiner*—James J. Gill
*Assistant Examiner*—Anthony V. Ciarlante
*Attorney, Agent, or Firm*—Beaman & Beaman

[57] ABSTRACT

A transducer for proportionally indicating small quantities of gas flow utilizing a rolling piston in association with a flexible electrical conducting band engaging terminals within the piston chamber. Gas flows from the chamber at an increasing rate proportional to piston displacement and the transducer is characterized by its low friction operation and capability to accurately sense low rates of gas flow.

9 Claims, 9 Drawing Figures

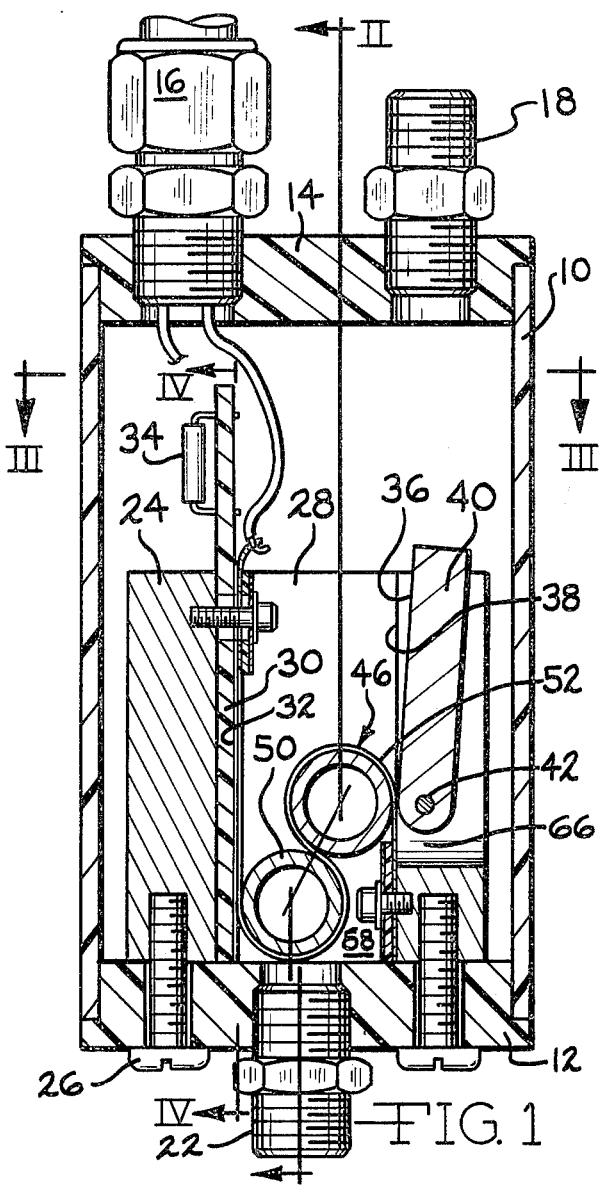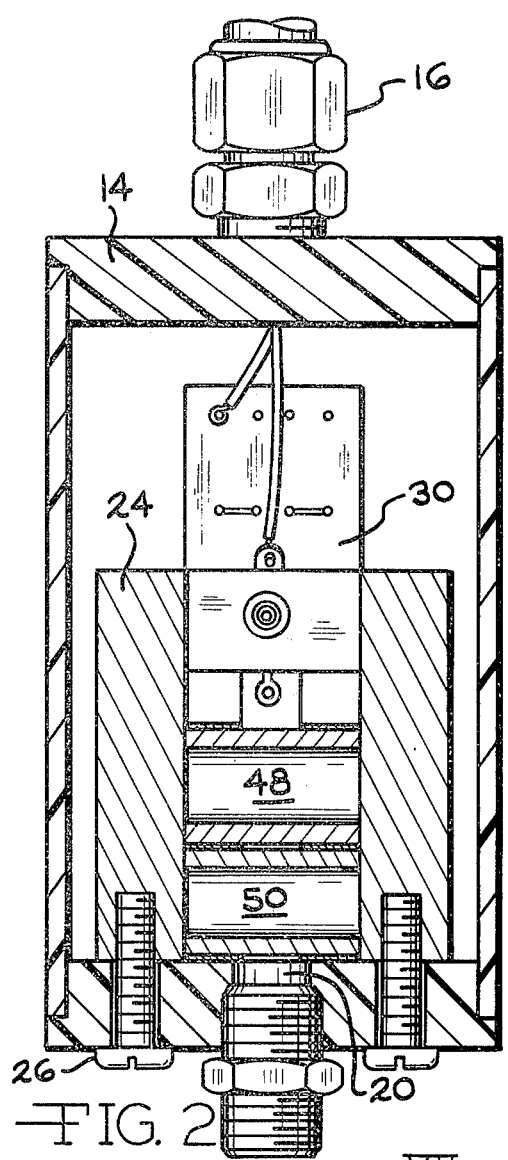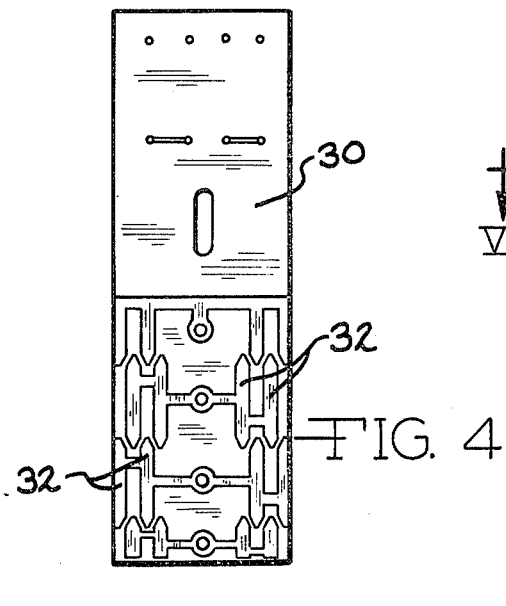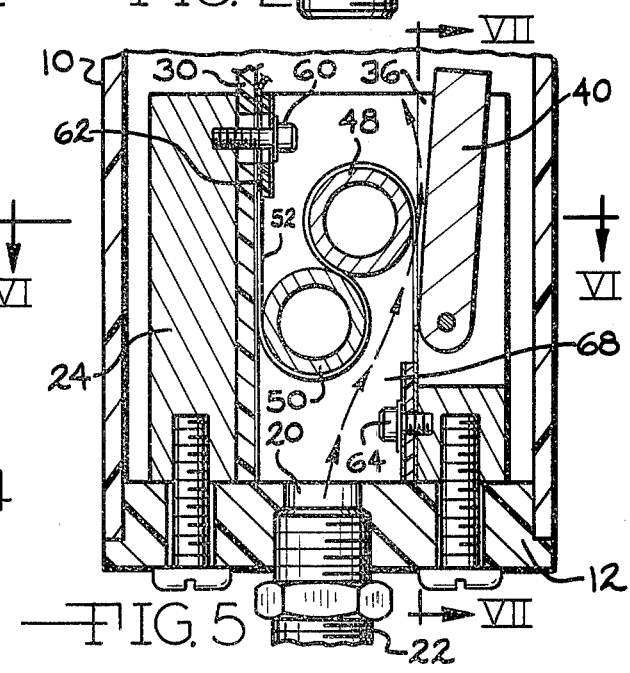
FIG. 1
FIG. 2
FIG. 4
FIG. 5

GAS FLOW TRANSDUCER UTILIZING ROLLING PISTON

BACKGROUND OF THE INVENTION

The field of the invention pertains to electric transducers for sensing gaseous flow and proportionally indicating the rate of such flow.

The rate of gas and fluid flow within conduits is often required information in gas and liquid treating systems, such as found in the chemical and petroleum processing arts. Flow meters take a variety of forms employing paddle wheels, propellers, dye and visual devices, and some use the viscosity of the moving medium to produce displacement of indicia means, such as a ball. A common type of visual flow meter displacing a ball wherein increased flow increases ball displacement is shown in Patent 1,889,705.

Difficulty has been encountered in accurately sensing and indicating low rates of gas flow since such low rates and small volumes must overcome the friction of displaceable means to produce gaging, and as many flow meters operate on a resistance principle wherein the resistance of flow about a displaceable member is used to displace the member, relative high rates of flow are usually required in order to produce sensing. Displaceable balls have been used in gas flow meters, as shown in U.S. Pat. No. 2,099,842, and electrical means have also been used in flow gages to indicate the position of the displaceable member as shown in U.S. Pat. No. 3,224,270. Further, a rolling piston has been employed in a flow meter utilizing a variable area outlet as shown in U.S. Pat. No. 1,454,301, and rolling pistons have been used in gas indicators as shown in U.S. Pat. Nos. 3,452,175 and 3,452,309. However, prior art devices have not been of such character as to provide an accurate electrical signal proportional to the rate of low gas flow volume and the present invention has been found to produce superior performance over those devices known to the applicants.

SUMMARY OF THE INVENTION

It is an object of the invention to provide a gas flow transducer capable of producing an electric signal proportional to the rate of gas flow even though such rate may be small.

Another object of the invention is to provide an accurate gas flow transducer producing electric signals proportional to the degree of piston displacement within a chamber wherein the operating characteristics of the piston are such as to produce very low friction, and piston displacement accurately reflects the rate of gas flow, even though such flow may be very small.

A further object of the invention is to provide a gas flow transducer utilizing a displaceable piston wherein piston displacement is electrically sensed, and the piston consists of a flexible and electrical conducting band and the band engages terminals within the piston chamber by a nonsliding engagement.

Yet a further object of the invention is to provide a low volume gas flow transducer which is relatively economical to manufacture, rugged, dependable in operation, self-resetting, and does not require springs or mechanical biasing means in its operation.

In the practice of the invention, a pair of cylindrical rollers constituting a piston are interconnected by a flexible band having its ends affixed to the chamber in which the piston is displaceable. The band is adapted to engage electrical terminals defined on a printed circuit board within the chamber and the chamber is provided with gas inlet and outlet ports spaced such that piston displacement permits flow from the chamber through the outlet port. The outlet port opening uniformly increases proportional to piston displacement indicating increased gas flow.

As the piston rollers occupy the entire cross-sectional configuration of the chamber, all of the gas within the chamber is utilized to produce piston displacement and piston movement itself controls gas flow through the outlet port.

In the practice of the invention only three movable elements are utilized and the piston rollers are displaceable against gravitational forces with very little frictional engagement with the chamber walls. The low frictional operating characteristics, in conjunction with the fact that the flexible band is directly "laid" upon the printed circuit board terminals, rather than resulting in a sliding engagement, assures a high degree of accuracy even though the rate of gas flow may be small.

BRIEF DESCRIPTION OF THE DRAWINGS

The aforementioned objects and advantages of the invention will be appreciated from the following description and the accompanying drawings wherein:

FIG. 1 is a diametrical elevational sectional view of a gas flow transducer in accord with the invention, the piston being shown in the zero or inactive position, FIG. 2 is an elevational substantially diametrical sectional view taken along section II—II of FIG. 1, FIG. 4 is a detail elevational sectional view illustrating the printed circuit board as taken along section IV—IV of FIG. 1, FIG. 5 is a detail sectional view similar to FIG. 1 illustrating the piston rollers in an elevated gas flow sensing position.

DESCRIPTION OF THE PREFERRED EMBODIMENT

Figure 3:
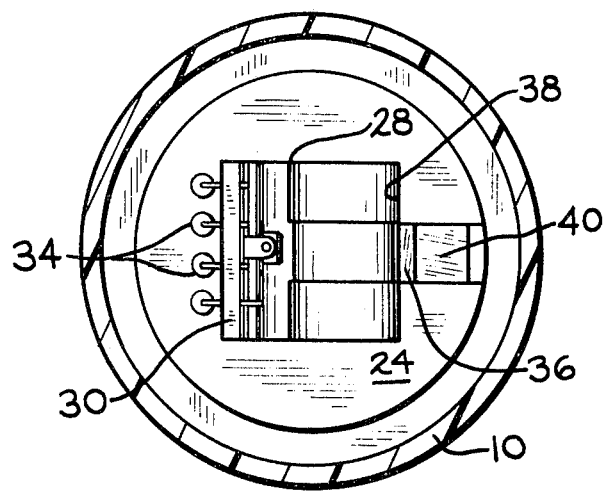
FIG. 3 is a plan sectional view taken along section III—III of FIG. 1.

With reference to the drawings, a gas flow transducer in accord with the invention includes a cylindrical housing 10 closed at its lower end by lower head 12 and at its upper end by upper head 14. The housing and heads may be formed of a synthetic plastic material and assembled by screws, or solvents, to define a gas tight volume. The upper head 14 is threaded to receive an electrical conductor fitting 16 and a gas discharge fitting 18. The lower head 12 includes a chamber inlet port 20 communicating with the threaded gas inlet fitting 22 to which the gas supply source is attached by appropriate conduits, not shown.

Figure 6:
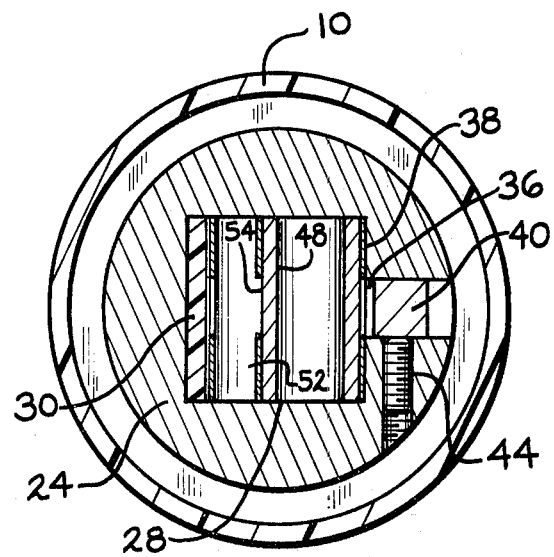
FIG. 6 is a plan sectional view taken through section VI—VI of FIG. 5.

A cylindrical casing 24 is attached to the head 12 by screws 26 and the casing is of a length less than the distance separating the heads 12 and 14 and includes a central rectangular bore or opening 28 having a height equal to that of the casing height, FIG. 1, and a length represented by the vertical dimension as shown in FIG. 6, and a width as represented by the horizontal dimension, FIG. 6. The port 20 communicates with the lower end of the opening 28.

The left sidewall of the opening 28, as shown in FIG. 1, has a dielectric printed circuit board 30 attached thereto and in the preferred embodiment the board has a width equal to the length of the opening, as will be appreciated from FIG. 6 wherein the board, in effect, defines one of the sidewalls of the effective gas chamber, as later described. The board 30 includes a plurality of elongated conducting terminals 32, FIG. 4, defined upon its surface facing the gas chamber, and the terminals are connected to resistors 34 attached to the upper portion of the board which extends above the upper end of the casing 24, FIG. 1. Electrical connectors passing through fitting 16 are connected to the printed circuit board and to the flexible band or strap utilized with the piston, as later described.

Figure 7:
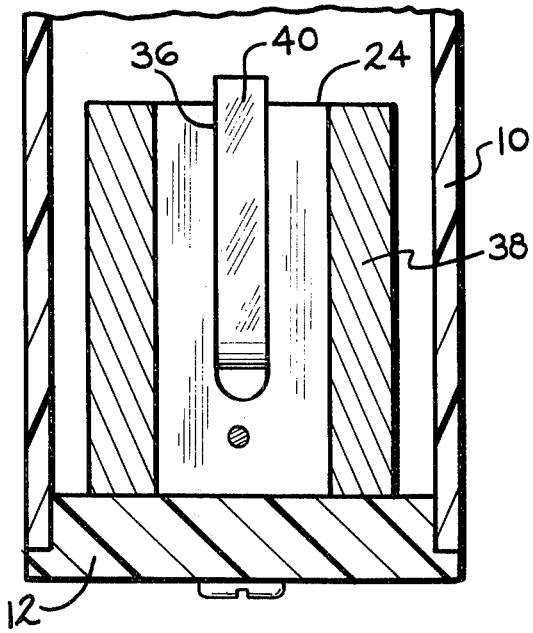
FIG. 7 is a detail elevational sectional view illustrating the chamber sidewall in which the outlet port is defined as taken along section VII—VII of FIG. 5.

An elongated outlet port 36 is defined in the opening sidewall 38 and centrally located therein, as will be appreciated from FIGS. 6 and 7. The port 36 is of an elongated configuration and has a variable area as defined by obliquely oriented vane 40. The lower inner edge of the vane is substantially aligned with the plane of the sidewall 38 while the upper portion of the vane edge is disposed to the right of the sidewall 38, as apparent in FIG. 5. The oblique angle of the vane 40 will be predetermined in accord with the various flow characteristics desired to be sensed by the transducer, and the vane is pivoted on a pin 42 for adjustment and is fixed in position, such as by a set screw 44, FIG. 6.

A piston 46 is displaceable mounted within the opening 28 and this piston collectively consists of a pair of cylindrical rollers 48 and 50 interconnected by a S-shaped metal band or strap 52. The rollers and band constitute an apparatus known in the mechanical arts as a "Rolamite", as shown in U.S. Pat. Nos. 3,452,175 and 3,452,309. In the practice of the invention, the rollers 48 and 50 are of a length only slightly less than the length of the opening 28, FIG. 6, and the diameter of the rollers is less than the width of the opening 28. The upper roller 48 is disposed adjacent sidewall 38, while the lower roller 50 is disposed adjacent the printed circuit board 30.

Figure 8:
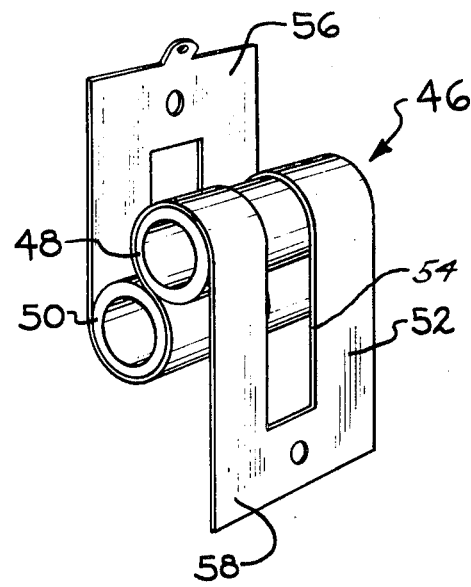
FIG. 8 is a perspective view of the section rollers and associated band, per se.

The configuration of the band 52 will be readily appreciated from FIG. 8, and the band includes a metering slot 54, an upper end 56 and a lower end 58. The upper end 56 of the band is attached to the printed circuit board 30 by a screw 60 passing through stop block 62, as shown in FIG. 1, while the lower end 58 is attached to the sidewall 38 adjacent the head 12 by screw 64 and its associated block. As will be noted in FIG. 5, the band end 58 extends vertically upwardly past the outlet portion 66, closing the same to gas flow.

The metering slot 54 defines a flow passage through the band in alignment with the elongated outlet port 36.

It will be appreciated that a chamber 68 is defined below the piston 46 in communication with the inlet port 20 and upon the introduction of gas into the chamber 68 the rollers 48 and 50 will be displaced upwardly due to the pressure within the chamber. Upward displacement of the rollers produces clockwise rotation of roller 48 and counterclockwise rotation of roller 50, and the movement of the rollers is a true rolling movement and the only sliding frictional contact between the rollers and the casing 24 is the nominal friction existing between the ends of the rollers and the casing walls.

As the piston rollers move vertically two occurrences simultaneously result. First, the terminals 32 defined upon the printed circuit board 30 engaged by the conducting band 52 will vary determined by the position of the piston 46. Secondly, the rate at which the gas is vented from the chamber 68 will also vary in accordance with the vertical position of the piston.

The path of gas flow through the chamber 68 is illustrated by the arrows in FIG. 5. Gas within the chamber passes through the band metering slot 54 and around the periphery of the upper roller 48 into the opening defined in the outlet port 36 between the roller periphery and the oblique vane 40. The higher the piston 46 is located in the opening 28 the greater will be the cross-sectional area through the outlet port and the greater the gas flow therethrough. As the gas flow through the chamber 68 diminishes gravitational forces acting upon the piston causes the roller 48 and 50 to lower, and upon gas flow terminating the rollers will be in the position shown in FIGS. 1 and 2.

It will, therefore, be appreciated that the introduction of gas into the chamber 68 causes various terminals 32 to be engaged by the conducting band 52 and through the resistances 34 connected to the terminals the electrical characteristics of the circuit flowing through the board vary proportional to piston movement. The electrical characteristics desired can readily be varied by varying the pattern and vertical dimension of the terminals 32 on the printed circuit board and the value of the resistors and, if desired, a large number of terminals may be located on the board to achieve a very precise differential voltage during minute vertical displacement of the piston.

Due to the vertical operational orientation of housing 10, the roller 48 will impose its weight upon the lower roller 50 in an oblique manner biasing the roller 50 toward the printed circuit board 30 and such gravitational biasing force will insure that the roller 50 is always biased toward the printed circuit board to maintain an effective electrical engagement between the band 52 and the terminals 32 in horizontal alignment with the diameter of the roller 50. As the piston rollers move vertically the band is rolled and unrolled upon the terminals without a sliding action and the wear problems attendant with sliding electrical contacts are eliminated. Excessive vertical displacement of the piston 46 is prevented by stop block 62 engaging with the lower roller.

The range and calibration of the transducer can be varied by changing the angle of the vane 40, and also by varying the weight of the rollers 48 and 50. The rollers may be hollow, as illustrated, and by varying the roller wall thickness the roller weight is readily predetermined.

Of course, it will be appreciated that the gas flowing through the outlet port 36 into the upper portion of the housing 10 will leave the housing through the fitting 18 and the appropriate conduit attached thereto, not shown.

If a visual indication of the rate of gas flow is desired, as well as an electric signal, the housing 10 and casing 24 may be formed of a transparent material or portions of the housing and casing may be formed of a transparent material in order to permit observance of the position of the piston rollers within the opening 28. Such visual observance may be desired in particular applications of usage.

Figure 9:
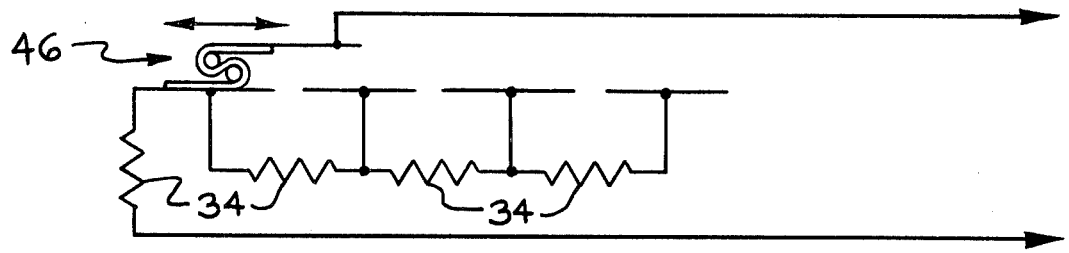
FIG. 9 is a schematic illustration of a typical electric circuit used with the transducer.

FIG. 9 illustrates a sample of circuitry which may be employed wherein leads having arrowheads represent output leads and the components thereon utilize those reference numbers previously employed. It will be readily appreciated that the circuitry defined on the printed circuit board may be varied in accord with those electrical results and sensitivity desired.

It is to be understood that modifications to the aforedescribed embodiment may be apparent to those skilled in the art without departing from the spirit and scope of the invention.

We claim:

1. A gas flow transducer comprising, in combination, a casing of a rectangular transverse cross section having a width and a length defining a chamber, a gas inlet port communicating with said chamber, a piston movably mounted in said chamber movable between minimum and maximum gas flow positions dependent upon the rate of gas flow into said chamber, said piston comprising a pair of cylindrical rollers each having a diameter less than the width of said chamber, parallel axes, and a length slightly less than the length of said chamber, an elongated gas outlet port communicating with said chamber at a location spaced from said inlet port and extending in the direction of piston movement, said piston controlling the location of gas flow into said outlet port, an electric signal circuit having a plurality of conducting terminals within said chamber spaced in the direction of piston movement, and electric conducting means mounted upon said piston engaging said terminals comprising a flexible band of electrical conducting material having a first end fixed with respect to said terminals, a central region passing about more than half of the circumferences of said rollers in an S-configuration and a second end fixed to said casing within said chamber, one of said rollers holding said band against said terminals during piston movement whereby said circuit produces an electric signal having characteristics dependent upon the position of said piston within said chamber.

2. In a gas flow transducer as in claim 1 wherein said chamber includes an end wall and a side wall, said inlet port being defined in said end wall and said outlet port being defined in said side wall, said outlet port having an elongated configuration parallel to said side wall and of an increasing dimension in a direction away from said end wall.

3. In a gas flow transducer as in claim 1 wherein said chamber is vertically oriented having a lower end wall and opposed side walls, said inlet port being located in said end wall and said outlet port being defined in one of said side walls, said one roller constituting a lower roller and the other roller constituting an upper roller, said terminals being located on the chamber side wall in opposed relation to said one side wall and said upper roller being disposed adjacent said one side wall and outlet port.

4. In a gas flow transducer as in claim 3 wherein said outlet port has an increasing dimension in an upward direction, said upper roller determining the effective dimension of the outlet port venting said chamber.

5. In a gas flow transducer as in claim 4, a printed circuit board within said chamber defining at least a portion of the chamber side wall opposed to said one side wall, said terminals being defined upon said board and engageable with said conducting band.

6. In a gas flow transducer as in claim 4 wherein said band includes an open central region defining a metering slot aligning with said outlet port when said band is disposed within said chamber adjacent said one side wall.

7. A gas flow transducer comprising, in combination, an elongated casing, a chamber defined in said casing having an end and a rectangular transverse cross section having a width defined by first and second parallel sidewalls and a length, a piston movably mounted within said chamber consisting of first and second parallel cylindrical rollers each having a diameter less than said width of said chamber and a length slightly less than the length of said chamber, an inlet port communicating with said chamber adjacent said end, an elongated outlet port defined in said second side wall extending in the direction of piston movement and transverse to the length of said rollers, a printed circuit board defining said first side wall, terminals defined upon said board within said chamber, a flexible electrical conducting band having a first end affixed to said board passing about said first roller toward said chamber end, between said rollers and about said second roller in an S-configuration and having a second end attached to said second side wall adjacent said end, said band being held against said terminals by said first roller whereby selected terminals are engaged by said band at predetermined positions of said rollers, and conducting means connected to said terminals.

8. In a gas flow transducer as in claim 7 wherein said outlet port uniformly increases in dimension in a direction away from said end, the location of said second roller determining the chamber venting dimension of said outlet port.

9. In a gas flow transducer as in claim 8 wherein said band includes a central region having a metering slot defined therein aligning with said outlet port when said band is disposed within said chamber adjacent said second side wall.

* * * * *